(12) United States Patent
Arens

(10) Patent No.: US 7,152,099 B1
(45) Date of Patent: Dec. 19, 2006

(54) FRIEND CONFIGURATION AND METHOD FOR NETWORK DEVICES

(75) Inventor: Douglas W. Arens, Roseville, CA (US)

(73) Assignee: Hewlett-Packard Development Company, LP., Houston, TX (US)

( * ) Notice: Subject to any disclaimer, the term of this patent is extended or adjusted under 35 U.S.C. 154(b) by 913 days.

(21) Appl. No.: 09/703,388

(22) Filed: Oct. 31, 2000

(51) Int. Cl.
G06F 15/177 (2006.01)

(52) U.S. Cl. .................. 709/220; 709/221; 709/245; 370/389

(58) Field of Classification Search ............... 709/220, 709/221–223, 217–219, 225–227, 245–246; 370/389, 401–402
See application file for complete search history.

(56) References Cited

U.S. PATENT DOCUMENTS

| | | | | |
|---|---|---|---|---|
| 5,819,042 A * | 10/1998 | Hansen | ...................... | 709/222 |
| 5,852,722 A * | 12/1998 | Hamilton | ................... | 709/221 |
| 5,854,901 A | 12/1998 | Cole et al. | | |
| 5,918,016 A * | 6/1999 | Brewer et al. | ............. | 709/220 |
| 6,009,103 A * | 12/1999 | Woundy | ..................... | 370/401 |
| 6,012,088 A * | 1/2000 | Li et al. | ..................... | 709/219 |
| 6,070,187 A * | 5/2000 | Subramaniam et al. | ..... | 709/220 |
| 6,286,038 B1 * | 9/2001 | Reichmeyer et al. | ....... | 709/220 |
| 6,389,464 B1 * | 5/2002 | Krishnamurthy et al. | ... | 709/220 |
| 6,532,217 B1 * | 3/2003 | Alkhatib et al. | ........... | 370/252 |
| 6,601,093 B1 * | 7/2003 | Peters | ....................... | 709/220 |
| 6,603,758 B1 * | 8/2003 | Schmuelling et al. | ...... | 370/352 |
| 6,629,145 B1 * | 9/2003 | Pham et al. | ................ | 709/230 |
| 6,678,732 B1 * | 1/2004 | Mouko et al. | .............. | 709/227 |
| 6,684,241 B1 * | 1/2004 | Sandick et al. | ............. | 709/220 |
| 6,687,755 B1 * | 2/2004 | Ford et al. | .................. | 709/245 |
| 6,691,170 B1 * | 2/2004 | Gitlin et al. | ................ | 709/245 |
| 6,697,360 B1 * | 2/2004 | Gai et al. | ................... | 370/389 |
| 6,697,851 B1 * | 2/2004 | Althaus et al. | ............. | 709/220 |
| 6,810,420 B1 * | 10/2004 | Buse et al. | ................. | 709/220 |
| 6,826,611 B1 * | 11/2004 | Arndt | ......................... | 709/226 |

FOREIGN PATENT DOCUMENTS

FR 2781952 2/2000

* cited by examiner

Primary Examiner—Philip B. Tran

(57) ABSTRACT

The present invention provides a network configuration and method where a first device that is unconfigured and connected to the network sends over the network a request for IP configuration information. Responsive to the request for IP configuration information from the first device, a second device that is configured for and connected to the network, responds with at least a portion of its IP configuration information. The at least a portion of the IP configuration of the second device is used to create IP configuration information for the first device.

23 Claims, 5 Drawing Sheets

FRIEND CONFIGURATION AND METHOD FOR NETWORK DEVICES

BACKGROUND OF THE INVENTION

The present invention is related to interconnected networks and pertains particularly to automated internet protocol (IP) address allocation and assignment for the internet protocol.

The Transport Control/Internet Protocol (TCP/IP) has entered the main stream as the protocol of choice for network connectivity. TCP/IP commonly referred to as IP, has a number of benefits which attract networks and users including standardization, rich protocol and application support and the ability to route over Wide Area Networks (WANs). There are a variety of ways to configure and set up an IP protocol stack. IP is flexible in that the protocol stack may be configured manually on the host, or automatically which minimizes the level of interaction by the network administrator.

Although IP has many benefits, because the protocol stack often needs to be manually configured, IP can be difficult to configure and administer. This is especially the case in environments where a network novice may be present. The steps required to setup and configure an IP host are not intuitive. A TCP/IP knowledgeable person is required to provide the basic configuration information. A person familiar with TCP/IP but not familiar with the network cannot properly configure IP since the currently available set of addresses, a subnet mask and default gateway are required. Implementation difficulties are further exacerbated by the fact that errors occurring during IP installation can cause severe network problems and can be difficult to solve.

For basic IP configuration, an IP address is selected and configured on the host entity. Selection of an IP address requires that the user know a unique address which corresponds to the network where the host entity is to operate. IP addresses are sometimes managed by a system administrator in order to guarantee uniqueness. Also, an IP subnet mask must be selected and configured on each host entity. Selection of the IP subnet mask is required so that it can be determined when an address in the host's protocol stack is meant for the local subnet and when an address should be passed to the default gateway. Optionally, IP configuration may include the selection and configuration of a default gateway on the host entity. In order to allow communication across multiple networks, the default gateway must be configured.

One method of defining IP configuration information is through the usage of a BOOTstrap Protocol (BOOTP). BOOTP allows clients to automatically receive all IP configuration information from a configured BOOTP server. This frees the user from having to configure individual entities but the BOOTP server itself needs to be configured.

Because the BOOTP server configuration requires assignment of unique IP addresses by the system administrator, it is administratively expensive and more prone to error than more automatic configuration methodologies. When a client sends unique MAC (Media Access Controller) address to the BOOTP server, the BOOTP server sends the client a IP address.

Another method of defining IP configuration information is through the usage of a Dynamic Host Configuration Protocol (DHCP). DHCP provides a framework for passing configuration information to hosts on a TCP/IP network. DHCP is based on BOOTP, but goes beyond it by adding the capability of automatic allocation of reusable addresses and configuration options. Like BOOTP, the configuration for individual entities must be configured on the DHCP server. DHCP reuses IP addresses but does not address the issue of friendly names associated with initiated addresses and how their associations may change.

One of the problems associated with both BOOTP and DHCP is the requirement of a BOOTP or DHCP server for assignment of IP addresses. A third protocol, AutoIP allows devices to claim IP addresses in the absence of a DHCP server or similar IP configuration authority. IP addresses are assigned from a reserved range of addresses that are only good for the local network. An unconfigured device will claim an address in the reserved range of addresses by randomly generating an address in the reserved range and then making an ARP request to see if the address has already been claimed by another device. AutoIP continually check for the presence of a DHCP server. If a DHCP server comes online, the previously configured AutoIP devices will attempt to switch their IP addresses to one provided by the DHCP server.

A network configuration and method is needed for transferring and/or assigning IP address and network information to devices that are connected to a network (which may or may not include a server) which works with current protocols, minimizes user and system administrator interaction, and minimizes the need for specialized software services.

SUMMARY OF THE INVENTION

The present invention provides a network configuration and method for transferring and/or assigning IP address and network information to devices that are connected to a network (which may or may not include a server, hub, router, or switch) which minimizes (1) interaction by the user or system administrator and (2) the need for specialized software services. The network includes at least one unconfigured "friend" device and one configured "friend" device.

In one embodiment, the unconfigured device sends out a request for configuration information to the other devices on the network. A configured device on the network responds to the request with at least a portion of its own IP configuration information. The at least a portion of the IP configuration information of the configured device is then modified to create IP configuration information for the unconfigured device. This modified information is then used to configure the previously unconfigured, device. In an alternative embodiment, the configured device periodically broadcasts at least a portion of its configuration information on the network without having received a request for information from an unconfigured device. Again, the at least a portion of the IP configuration information of the configured device is then modified to create IP configuration information for the unconfigured device.

The described network configuration and methodology is different from other methodologies where the IP address for the unconfigured device is merely assigned by other configured devices. Instead, in the present invention, a configured device sends back information to the unconfigured device about the network environment. The unconfigured device uses this information about the network environment to create its own IP address.

Because the method and configuration of the described invention leverages information available from other configured network devices, the IP address for the first device is consistent with IP addresses already defined on the network. Devices using the "friend" configuration or protocol may be designed to interoperate and cooperate by automatically sharing basic information. For example, in one embodiment SYSLOG information may be passed from a second configured device to a first device. The other network information, in this case SYSLOG information, may be passed to the first device with the requested IP configuration information. Alternatively, the other network information may be passed to the first device after it has been configured in a separate request for information.

The described configuration and method does not depend on all of the devices in the network being capable of understanding, being aware of or responding to a request for information from the first device. Further, the "friend" configuration and method does not require extra equipment to implement. For example, no server is needed to implement the friend configuration or method. This is important for home computer systems or networks where low cost is critical. Further, no extra software services need be installed on servers or other network infrastructure.

The friend configuration and methodology described by the present invention is designed to automate and simplify the installation of new or unconfigured devices on the network. The ease of installation of new network devices on a network is a valuable feature to customers. Because the methodology is automatic and thus requires minimal user interaction, system errors are reduced, installation time is reduced, and system costs are reduced since the need for highly trained system administrators is reduced.

A further understanding of the nature and advantages of the present invention may be realized with reference to the remaining portions of the specification and the attached drawings.

DETAILED DESCRIPTION OF THE PREFERRED EMBODIMENTS

Figure 1:
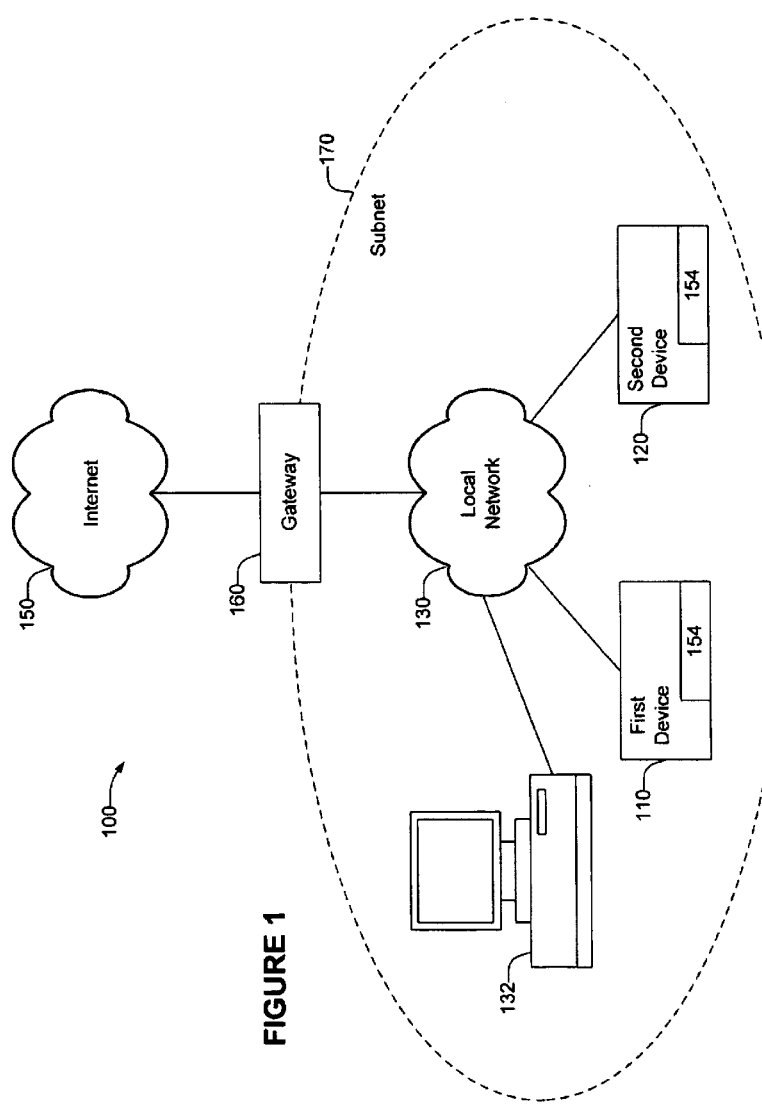
FIG. 1 shows a simplified block diagram of a network configuration according to the present invention.

The present invention provides a network configuration and method for transferring and/or assigning IP address and network information to devices that are connected to a network, which may or may not include a server. Referring to FIG. 1 shows a network configuration 100 according to the present invention. The network 100 includes a first device 110, a second device 120, and a local console 132 that are connected by a local network 130. The local network 130 is, for example, one or a combination of local area networks. The local console 132, first device 110 and second device 120 are shown connected to, and may be considered part of the local network 140. The local network 130 is, for example, connected to the Internet 150 through a gateway 160. A dotted line 170 is representative of the subnet boundary for the network.

The network configuration shown in FIG. 1 is only representative. A network may consist of as few two devices connected to each other, or thousands of devices connected on an intracompany network, to hundreds of millions of devices connected on a network via the Internet. Thus, FIG. 1 is just illustrative of the number of connections and levels of connections that could be made according to the network configuration of the present invention. Such network connections and protocols are well known. The network could be, for example, could be connected in an Ethernet or token ring network.

In one embodiment the network configuration includes a first device that is unconfigured and connected to the network; and a second device that is configured and connected to the network, wherein the second device sends over the network at least a portion of its own configuration information, wherein the at least a portion of the configuration information of the second device is used to create configuration information for the first device. In the described embodiment information is typically periodically broadcast by the configured second device. Although the range of the network broadcast may vary, typically the configuration information if the second device broadcast to devices on the same subnet.

In an alternative network configuration, the network includes a first device 110 that is unconfigured and connected to the network, the first device 110 being capable of sending over the network a request for IP configuration information; and a second device 120 that is configured for the network and connected to the network, wherein responsive to the request for IP configuration information from the first device, the second device responds with at least a portion of its IP configuration information, wherein the at least a portion of the IP configuration of the second device is used to create IP configuration information for the first device. Although the range of the network broadcast may vary, typically the request of the first device for IP configuration information and the response by the second device is broadcast on the network to devices on the same subnet.

Both the first and second device may be a variety of devices, including but in no means limited to a router, hub, switch, server, printer, PC, workstation, scanner, or storage device. Both the first device and the second device are "friends". A "friend" device has the ability to broadcast its configuration information over the network and the ability to create from the configuration information of another configured device on the network, its own configuration information. In an alternative embodiment, a "friend" device would also have the capability to send out a request on the network for configuration information and the ability to respond to a request from another friend device for configuration information. Typically, the "friend" capabilities of sending and receiving network information and performing the required modifications according to the friend protocol are implemented in computer software or alternatively in firmware 154 stored on the device.

Figure 2A:
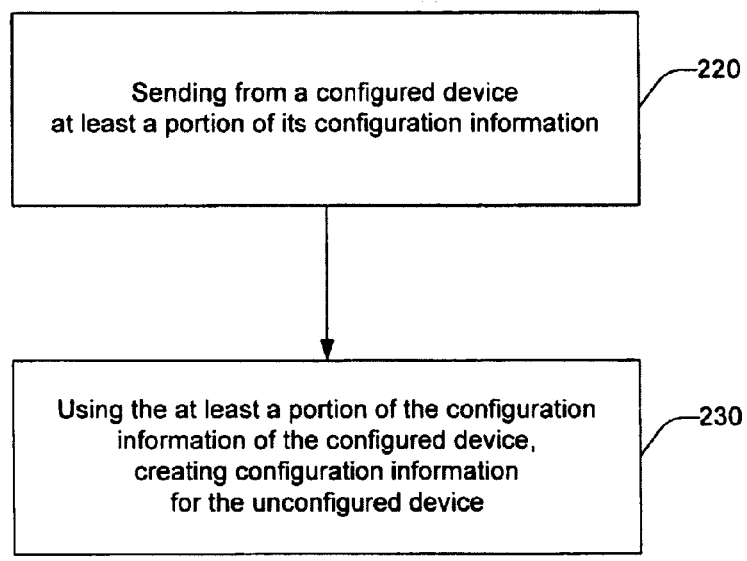
FIG. 2A shows a flowchart of one method of transferring network information from a configured device in the network to an unconfigured device in the same network according to the present invention.

FIG. 2A shows a flowchart of one method of transferring network information from a configured device in the network to an unconfigured device in the same network according to the present invention. Referring to FIG. 2A, the method includes the steps of: sending from the second device that is connected to and configured for the network at least a portion of its configuration information; and using the at least a portion of the configuration information sent from the second device to create configuration information for the first device, wherein the first device is connected to the network and initially unconfigured.

Figure 2B:
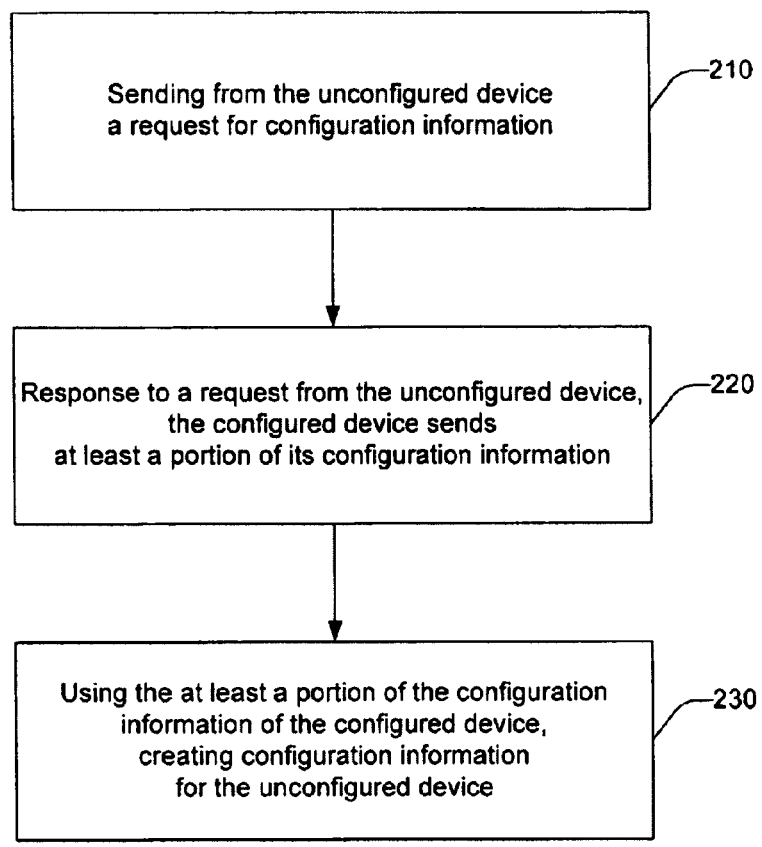
FIG. 2B shows a flowchart of an alternative method of transferring network information from a configured device in the network to an unconfigured device in the same network according to the present invention.

FIG. 2B shows an alternative flowchart of the method of transferring network information from a first device in the IP network to a second configured device in the same network. The method of transferring network information includes the steps of sending from the first device, wherein the first device is unconfigured, a request on the network for IP configuration information (step 210); wherein a second device configured for the network, responsive to the request on the network for IP configuration information, responds with at least a portion of its IP configuration information (step 220); and using the at least a portion of the IP configuration information of the second device, creating IP configuration information for the first device (230). Compared to the embodiment shown in FIG. 2A, the flowchart shown in FIG. 2B includes the additional step of sending a request from the first device for configuration information. For the embodiment described and shown in FIG. 2B, the step of sending out the configuration information of the second device, is only done in response to a request by the first device.

In the described embodiments, the first device is unconfigured and connected to the network. By unconfigured, we mean that the device on the network is not recognized by the other devices on the network. Typically, this would mean that the device does not have an assigned IP address. A device typically does not have an assigned IP address when it is has been recently added to the network.

In the described configuration, the first device 110 which contains the "friend" configuration features identifies that it is unconfigured and broadcasts a unique "unconfigured" multicast packet to the other devices on the relevant network. For an unconfigured first device 110, the first device 110 sends out a request for IP configuration information, and a second device 120 responds with at least a portion of its IP configuration information. A second device 120 that is configured for the network and connected to the network is capable of understanding a request of the first device for network information. When configuration of the first device is required, the second device will send out a portion of its IP configuration information. In the preferred embodiment, the first and second device are on the same subnet.

The format for transferring network information between devices on the network can be achieved using a variety of formats and protocols. For example, the request for information from the first device or the response from the second device could be sent in a flexible hierarchical format. Similarly data could be sent in a number of predefined formats including text. Further, under one embodiment of the present configuration and method, the two devices would not be required to understand all of the information transferred in a data transfer. For example, in one embodiment IP configuration data might include the data transfer of the address of a SYSLOG server that is not needed for operation of the device that the network information was transferred to. Further, in one embodiment data transferred between devices might be encrypted to prevent unwanted sharing between devices on the network.

Figure 3:
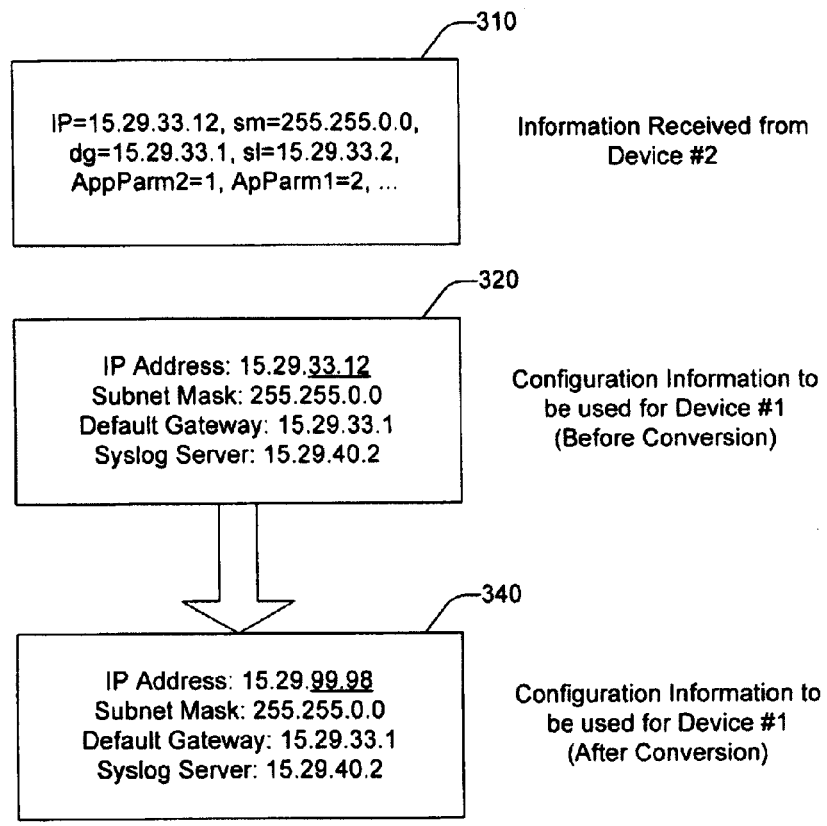
FIG. 3 shows an example of network information that is broadcast from a configured device on a TCP/IP network broadcast over a network to an unconfigured device.
Figure 4:
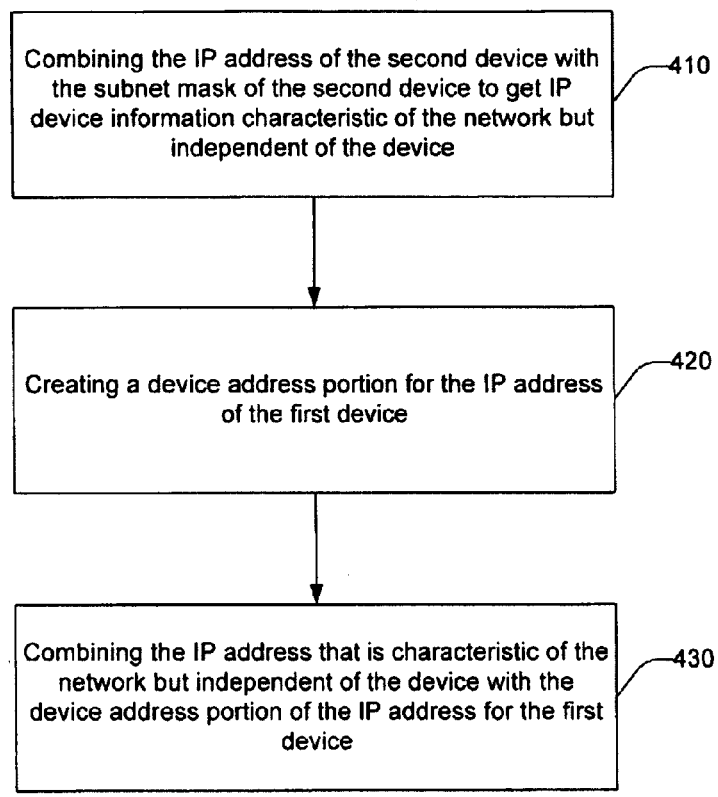
FIG. 4 shows a flowchart of the steps of using at least a portion of the IP configuration information of the second device to create IP configuration information for the first device for one embodiment of the invention.

FIG. 3 shows an example of network information that is broadcast from a configured device on a TCP/IP network broadcast over a network to an unconfigured device. Although an illustrative format for network information is shown, other formats representative of different networks or protocols may also be used in combination with the present invention. For example, the described method and configuration could be used on network having the IPv4, IPv6, Novell, Appletalk, or DLL/LCC protocols.

Referring to block 310 shows the type of network information that would be broadcast from the second configured device in step 220. The network information includes an IP address (IP=15.29.33.12), a subnet mask (sm=255.255.0.0), a default gateway (dg=15.29.33.1), a SYSLOG server (sl=14.29.33.2) and AppParm1 and AppParm2 parameters (AppParm2=1, AppParm1=2).

In order to create IP configuration information for the first device, the second device typically broadcasts at least the minimum information required to configure the first IP device. The second device is not required to send all of its IP configuration information (it sends at least a portion of its IP configuration information), but typically sends the minimum information required to configure the first device. In one embodiment, the minimum information required to configure the first device is the IP address and its subnet mask of the second configured device. Thus, for this example, the second device would broadcast respond with an IP address (IP=15.29.33.12), a subnet mask (sm=255.255.0.0). In an alternative embodiment, the second device might broadcast or alternatively respond to the first device's request for IP configuration information with a response that includes network information other than the minimum information required to configure the first device. For example, the second device may respond to the first device's request with its IP address, its subnet mask, a default gateway IP address for the network, and SYSLOG server IP address. In this example, the second configured device then would broadcast an IP address (IP=15.29.33.12), a subnet mask (sm=255.255.0.0), a default gateway (dg=15.29.33.1), a SYSLOG server (sl=14.29.33.2).

In one embodiment, after the broadcast of network information has been received from the second device, it is evaluated to determine whether the broadcast of the second device will be accepted and used to create IP configuration information for the first device. The first device may choose not to accept a broadcast from a device that is not compatible or does not work optimally with it.

After determination is made whether to accept data from the device broadcasting the information, the first device determines which information received from the second device it can use to configure itself. As previously stated, in one embodiment, the second device might respond to the first device's request with its IP address, its subnet mask, a default gateway IP address for the network, and SYSLOG server IP address. However, the first device might determine that it needs only the IP address and subnet mask of the second device to configure itself.

Unlike other conventional processes, where the server assigns an IP address to an unconfigured device or a default IP address is assigned, in the present invention the IP address of an unconfigured device is created using the IP address of a device on the network that is already configured. This device may be a server, but there is certainly no requirement that the device be a server.

In one embodiment, the steps of using at least a portion of the IP configuration information of the second device to create IP configuration information for the first device includes the steps of: combining the IP address of the second device with the subnet mask of the second device to get an IP device characteristic of the network but independent of the device (step 410); creating a device address portion for the IP address of the first device (step 420); and combining the IP address that is characteristic of the network but independent of the device with the device address portion of the IP address for the first device (430). The order of steps 410 and 420 is not critical, however, both steps must be performed before step 430.

The step of combining the IP address of the second device with the subnet mask of the second device to get an IP device characteristic of the network but independent of the device (step 410) gives a result that will be used to create an IP address portion for the first device that is consistent with other devices in the network environment. Referring to block 320 of FIG. 3, the bolded portion of the IP address 15.29 is the portion of the IP address that is characteristic of the network but independent of the device. Referring to block 330 of FIG. 3, shows an IP address 15.29.99.98. The portion of the address that is in bold (99.98) is the device address portion of the IP address that was created for the first unconfigured device. The device address portion for the IP address for the first unconfigured device should have the same number of bits as the device address portion of the IP address for other devices on the network.

The device address portion for the IP address of the first device could be created in a number of ways. For example, the device address portion of the first device could be created iteratively or using a hash algorithm or other type of algorithm, to create a random address. In the preferred embodiment, the device address portion for the IP address of the first device is unique.

After steps 410 and 420, the IP address that is characteristic of the network but independent of the device is combined with the device address portion of the IP address for the first device (430) to create an IP address for the first device. Referring to block 330, the newly created IP address is 15.29.99.98, a combination of the device address portion of the IP address and the portion of the IP address that is characteristic of the network but independent of the device.

Typically, the first device will perform a test by attempting to contact the IP address that was created for the first device. If there is no response to the test then it is assumed that the IP address that was created for the first device is not in use. This IP address will then be considered assigned to the first device. In one embodiment, after the test is performed and no device responds, the first device would send out information to the network to announce that the first device is available for use and is claiming its new network IP address. This announcement is broadcast to the subnet, for example using an Internet Control Message Protocol Ping. The announcement is recognized and is typically stored by the nearest router on the subnet.

In the case where the test is performed and an answer is received from a device on the network, a new device address portion of the first device is generated (step 420). The newly generated device address portion of the first device is then combined with the IP address that is characteristic of the network but independent of the device (step 430). The test to determine whether another device on the network has the created IP address is then performed again. This process is repeated until a unique IP address for the first device is created.

After the first device is configured, the first device may (1) use other network information passed to it in the response from the second configured device or (2) request additional network information. For example, in one embodiment SYSLOG information may be passed from a device on the network to the first device. The other network information, in this case SYSLOG information may be passed to the first device with the requested IP configuration. Alternatively, the other network information may be passed to the first device after it has been configured in a separate request for information.

The foregoing discussion discloses and describes merely exemplary methods and embodiments of the present invention. As will be understood by those familiar with the art, the invention may be embodied in other specific forms without departing from the spirit or essential characteristics thereof. Accordingly the disclosure of the present invention is intended to be illustrative, but not limiting of the scope of the invention, which is set forth in the following claims.

What is claimed is:

1. A network configuration comprising:
   one or more configured devices each of which comprises a server, hub, router, client or switch connected to the network, wherein at least one of the configured devices is capable of sending over the network at least a portion of its configuration information including its IP address and its subnet mask; and
   an unconfigured device which comprises a server, hub, router, client, or switch connected to the network, wherein the unconfigured device is capable of creating its own configuration information by
      combining the IP address of a single one of the configured devices with the subnet mask of the single one of the configured devices to form a device-independent address characteristic of the network;
      generating a device address associated with the unconfigured device; and
      combining the device-independent address with the device address to form a unique IP address of the unconfigured device.

2. The network configuration recited in claim 1 wherein said unconfigured device modifies the configuration information of said configured device received from said configuration device to create said configuration information for itself.

3. The network configuration recited in claim 2 wherein said configured device sends said configuration information in response to the request for configuration information from said unconfigured device.

4. The network configuration recited in claim 1 wherein said unconfigured device is capable of sending a request for configuration information over the network.

5. The network recited in claim 1 wherein said configuration information created for said unconfigured device is created by said unconfigured device modifying the portion of said configuration information of said configured device.

6. The network configuration of claim 1, wherein the IP address and the subnet mask are separate data items.

7. The network configuration of claim 1, wherein the configured device is not a server, and wherein the unique identification address is not limited to one of a reserved range of addresses corresponding to a local portion of the network.

8. A computer-implemented method of configuring an unconfigured device connected to a network using configuration information of one configured device connected to the network, comprising:
   sending over the network from the one configured device to the unconfigured device at least a portion of the configuration information of the configured device, the portion including an IP address and a subnet mask of the configured device, the IP address and the subnet mask of the configured device usable by the unconfigured device to create configuration information by combining the IP address of the one configured device with the subnet mask of the one configured device to form a device-independent address characteristic of the network;

generating a device address associated with the unconfigured device; and combining the device-independent address with the device address to form a unique IP address of the unconfigured device.

9. The method recited in claim 8 wherein after the unconfigured device is configured, the configured device can respond to the unconfigured device with network information other than configuration information.

10. The method recited in claim 8 further including the configured device responding with network information other than configuration information.

11. The method recited in claim 10 wherein the other network information is SYSLOG information.

12. The method of claim 8, wherein the sending comprises broadcasting the portion of the configuration information over the network without receiving a request for the portion from the unconfigured device.

13. The method of claim 8, comprising:

receiving from the unconfigured device a request for the portion of the configuration information, wherein the sending is responsive to the receiving.

14. A computer-implemented method of configuring an unconfigured device connected to a network using configuration information of one configured device connected to the network, comprising:

receiving from the one configured device over the network at the unconfigured device at least a portion of the configuration information of the configured device, the portion including an IP address and a subnet mask of the configured device; and the unconfigured device creating configuration information for the unconfigured device by combining the IP address with the subnet mask to form a device-independent address characteristic of the network, generating a device address associated with the unconfigured device, and combining the device-independent address with the device address to form a unique IP address of the unconfigured device.

15. The method recited in claim 14 further including sending from the unconfigured device a request on the network for configuration information.

16. The method recited in claim 15 wherein the configured device responds to the request from the unconfigured device for configuration information with at least a portion of its configuration information.

17. The method as recited in claim 15 wherein the request comprises a multicast packet that indicates that the sending device is unconfigured.

18. The method recited in claim 14 further including determining whether to accept the at least a portion of the configuration information from the configured device.

19. The method recited in claim 14 further including determining whether configuration address information was received from a compatible device.

20. The method recited in claim 14 further including communicating with the configured device or other devices on the network that the unconfigured device is now configured and available for use.

21. The method recited in claim 14 further including confirming that the IP address created for the unconfigured device is not currently in use.

22. The method recited in claim 14 wherein the device address of the unconfigured device is generated using a hash algorithm.

23. The method of claim 14, comprising:

the unconfigured device requesting the portion of the configuration information from the configured device.

* * * * *

UNITED STATES PATENT AND TRADEMARK OFFICE
CERTIFICATE OF CORRECTION

| | |
|---|---|
| PATENT NO. | : 7,152,099 B1 |
| APPLICATION NO. | : 09/703388 |
| DATED | : December 19, 2006 |
| INVENTOR(S) | : Douglas W. Arens |

It is certified that error appears in the above-identified patent and that said Letters Patent is hereby corrected as shown below:

On the title page, item (73), in "Assignee", in column 1, line 2, after "Company," delete "LP.," and insert -- L.P., --, therefor.

Signed and Sealed this

Twelfth Day of May, 2009

JOHN DOLL
*Acting Director of the United States Patent and Trademark Office*